July 6, 1937.    G. A. MINER    2,085,990
INSOLE UNIT AND METHOD OF MAKING THE SAME
Filed April 2, 1936
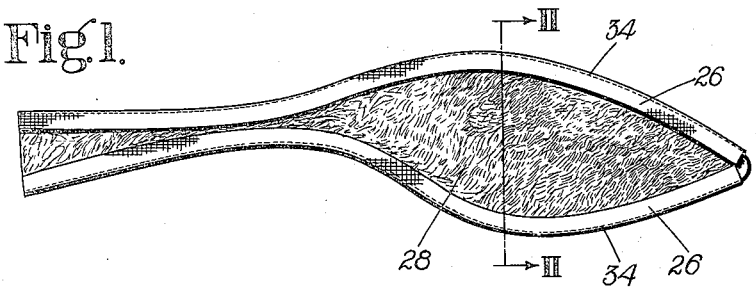
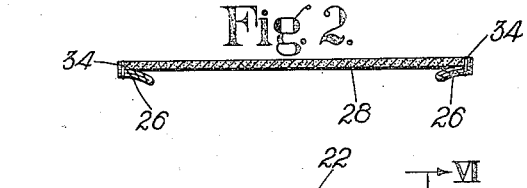
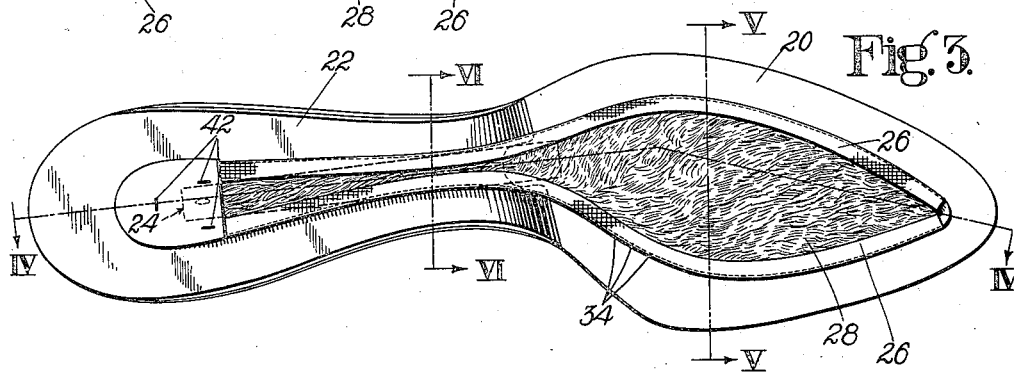
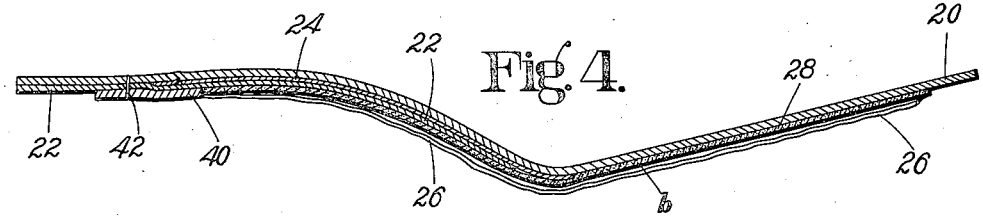
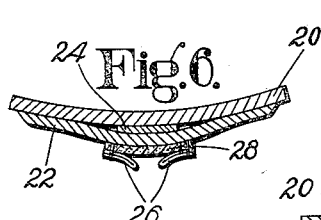
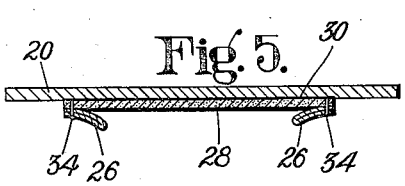
INVENTOR
George A. Miner
By his Attorney
Victor Cabl.

Patented July 6, 1937

2,085,990

UNITED STATES PATENT OFFICE 2,085,990

INSOLE UNIT AND METHOD OF MAKING THE SAME

George A. Miner, Goffstown, N. H., assignor to United Shoe Machinery Corporation, Paterson, N. J., a corporation of New Jersey Application April 2, 1936, Serial No. 72,396

11 Claims. (Cl. 36—22)

This invention relates to improvements in insole units and to improved methods of making the same and is herein illustrated with reference to the manufacture of reinforced insole units of the type comprising an insole and a heel-and-shank reinforcing piece which is secured to the lower or lasting side of the insole.

One object of the invention is to provide a reinforced insole unit which is adapted for use in the manufacture of shoes the uppers of which are to be cement-lasted in accordance with methods such, for example, as that disclosed and claimed in United States Letters Patent No. 1,932,545, granted October 31, 1933, upon application of George Goddu.

With this object in view the invention, in one aspect, provides an improved method of making reinforced insole units which, as herein exemplified, consists in securing a shank reinforcing piece to the lower or lasting side of an insole and molding the reinforcing piece and the adjacent portion of the insole to shape them to correspond to the curvatures in the shank portion of a last bottom, forming a filler piece substantially smaller than the insole and having an edge contour corresponding to that of the shank and forepart of the insole, stitching a tape to one side of the shank and forepart of the filler piece in position to provide a marginal lasting lip, and securing the opposite side of the filler piece to the lasting side of the forepart of the insole and to the previously molded reinforcing piece in position to leave exposed marginal portions of the insole forepart and the reinforcing piece of substantial width outside of the lasting lip to receive the lasting allowance of a shoe upper. As illustrated, the lip-forming tape may be stitched along one edge to the edge of the filler piece or the tape may be folded along its median line and the free edges of both layers of the tape stitched to the filler piece so as to form a two-ply lip. The filler piece is preferably formed of soft flexible material, such as felt, so as to have no tendency to stiffen the forepart of the shoe bottom and in order to provide a cushion for the forepart of the foot. In making a shoe in which my improved insole is incorporated the presence of the filler piece locates the inner boundary of the cement bond between the insole and the lasting allowance of the upper along the line substantially parallel to the sole edge and thus facilitates the trimming of the lasting allowance substantially along that line. The illustrated filler piece is made of substantial thickness to enhance its cushioning effect and the better to adapt its edge to function as a lasting shoulder for deflecting upwardly the edge portions of the lasting allowance so as to facilitate the trimming of the latter. Moreover, the thickness of the filler piece is preferably made to correspond substantially to that of the lasting allowance of the shoe upper materials so that the filler piece will completely fill the space between the inner and outer soles within the trimmed edges of the upper and thus render unnecessary the use of any additional filling material for that purpose.

Invention is also to be recognized as residing in insoles or reinforced insole units of improved construction resulting from the practice of my improved method.

The invention will now be explained with reference to the accompanying drawing, in which Fig. 1 is a plan view of a filler piece provided with a lasting lip and adapted for attachment to a reinforced insole unit;

Fig. 2 is a cross-sectional view taken along the line II—II of Fig. 1;

Fig. 3 is a bottom plan view of a reinforced insole unit having the filler piece shown in Fig. 1 attached thereto;

Fig. 4 is a sectional view taken along the line IV—IV of Fig. 3;

Figs. 5 and 6 are sectional views on an enlarged scale taken along the line V—V and VI—VI, respectively, of Fig. 3; and Fig. 7 is a fragmentary cross-sectional view illustrating a modified construction.

In the practice of my improved method a full-length insole 20 is formed of leather or other relatively flexible material as by a sole rounding or a die cutting operation and a heel-and-shank reinforcing piece 22 of fiber, leatherboard or other relatively stiff material is rounded or died out to the same contour as that of the heel and shank portions of the insole. The surface portions of these parts which are to be in contact with each other when they are assembled to make up an insole unit having been coated with cement, a longitudinally arched shank stiffener 24 is properly positioned upon the coated side of the insole and the reinforcing piece is laid upon the insole over the shank stiffener with its edges aligned with those of the heel and shank portions of the insole. As shown in Figs. 3 and 4, the front end of the shank stiffener 24 projects forwardly a short distance beyond the front edge of the reinforcing piece. The parts are then secured together by means of the cement and at the same time the shank portions of the insole and the reinforcing piece are molded both longitudinally and transversely to correspond to the curvatures of the bottom of the last, as indicated in Figs. 4 and 6. Advantageously, these securing and molding operations may be performed in accordance with the method and by the use of the apparatus disclosed in a pending application for United States Letters Patent, Serial No. 669,842, filed May 8, 1933, in the name of John M. Whelton.

In accordance with my invention the lasting lip of the insole unit is formed of continuous tapes 26 or strips of fabric or other material which extend along the opposite marginal portions of the insole unit and are secured to the insole in the forepart of the unit and to the reinforcing piece in the shank portion of the unit. While the tapes or members which are to constitute the lasting lip may be applied directly to the lower surface of the unit and secured thereto by means of stitches extending through the forepart of the insole and through both the insole and the reinforcing piece in the shank portion of the unit, it is more or less difficult to stitch through the relatively stiff reinforcing piece and, moreover, such a method of attaching the lip members is not practicable in cases where the shank portions of the insoles are quite narrow, inasmuch as the shank stiffener which is interposed between the reinforcing piece and the insole would interfere with the stitching operation. Accordingly, I prefer, as herein illustrated, to secure the tapes 26 by first stitching them to a filler piece, such as the filler piece 28, and thereafter securing the filler piece to the insole unit by means of cement, as indicated at 30 in Fig. 5. However, the filler piece may be stitched to the insole unit as indicated in Fig. 7, wherein the filler piece attaching stitches 32 serve also to secure the tapes or lasting lip members in place.

The filler piece 28 is advantageously formed of felt or other flexible cushioning material and it may be cut out by means of a die or otherwise to a sole-shaped contour corresponding substantially to that of the insole although, as shown, it is cut substantially smaller than the insole in order that it may be so located on the insole unit as to leave exposed between its edge and the edge of the unit a substantial width of insole unit margin to which the lasting allowance of the upper may be cemented and so that the tapes which are to be stitched to the edges of the filler piece will be spaced inwardly in the desired relation to the edge of the insole unit. Preferably, the filler piece 28 is made of a thickness substantially equal to that of the marginal portions of the upper materials which are to be secured in overlapped position on the insole unit so that the filler piece will function to fill completely the space inside the upper margins between the insole and the outsole and thus render unnecessary the application of any additional filling material for that purpose. Being made of soft yielding material such as felt and being of the thickness above described, the filler piece 28 will constitute an effective cushion in the forepart of a shoe in which the insole is incorporated and thus will render the shoe more comfortable than an ordinary shoe.

The tapes or strips of material which are to constitute the lasting lip may be of single thickness, as indicated in Fig. 7, or, as illustrated in the other figures, each strip may be folded over along its median line so as to be of double thickness. As illustrated in Figs. 1 and 2, the overlapped free edge portions of the strips are secured by means of stitches 34 to the opposite margins of the filler piece 28. The stitches 34 are purposely located close to the edge of the filler piece 28 so that the stitches will reinforce the extreme marginal portion of the filler piece thereby better adapting the edge of the latter to perform its function as a lasting shoulder. Moreover, the outer edge of the tape constituting the lasting lip is intentionally made flush with the edge of the filler piece to increase the effective height of the lasting shoulder. Thus, where a folded tape is employed the outer edge of the two-ply lip formed by the tape presents outer edges which are strengthened by the attaching stitches and quite substantially augment the effectiveness of the edge of the filler piece as a lasting shoulder.

After the tapes 26 have been stitched to the filler piece, the filler piece is coated with cement and is secured, by means, for example, of a suitable presser pad (not shown) to the lower or lasting side of the insole unit comprising the insole and the reinforcing piece which have already been secured together and molded. Inasmuch as a very substantial amount of longitudinal curvature is imparted to the reinforcing piece and insole by the molding operation, it is of considerable importance to have the molding take place, as herein described, before the filler piece is secured to the reinforcing piece so as to insure against such stretching of the filler piece and such resulting distortion of the lasting lip as would unavoidably take place if the molding did not precede the attaching of the filler piece. The filler piece may be located relatively to the insole unit with or without the use of suitable gaging means so as to leave exposed the desired substantially uniform width of margin at the lasting side of the unit to receive the lasting allowance of the upper. While the filler piece is being pressed against the insole unit the tapes 26 will lie flat against the filler piece and thus will have no tendency to interfere with the application of the attaching pressure.

Alternatively the forepart only of the filler piece (with the lasting lip secured thereto) may be secured to the forepart of the insole before the reinforcing piece has been secured to the insole and thereafter the reinforcing piece and the shank stiffener may be assembled with the insole and the reinforcing piece and the insole secured together and molded after which the shank portion of the filler piece may be laid over and secured to the reinforcing piece. If the shank stiffener 24 is positioned with its front end projecting forwardly beyond the front edge of the reinforcing piece 22, it will be covered by the filler piece 28 and thus will have less tendency to work into or through the outsole. By thus utilizing the filler piece to cover the projecting front end of the shank stiffener the latter will not rub against the outsole in such a way as to result in squeaking while the shoe is being worn. It is to be noted that the application of the filler piece after the molding of the reinforcing piece has been accomplished also insures against such tearing or breaking away of the filler piece where it covers the projecting end of the shank stiffener at the break line of the insole unit as would otherwise be liable to occur. It is particularly important to preserve the integrity of the filler piece in the location referred to in order to avoid squeaking and possible injury to the outsole by the front end of the shank stiffener.

As illustrated in Figs. 3 and 4, a separate filler piece 40 may be secured by staples 42 or otherwise to the central heel-seat portion of the reinforcing piece 22, the filler piece 40 being made of leatherboard, fiber, or other relatively stiff and unyielding material and constituting a projection on the reinforcing piece shaped to fill in the space within the overlasted margins of the shoe upper in the heel-seat portion of the shoe and thus to facilitate the secure attachment of a heel to the shoe by providing for intimate contact between the heel and shoe bottom in the central portion of the cup of the heel.

As a result of the practice of the above-described method, a reinforced insole unit having a reinforcing piece located at its lower or lasting side is provided with a lasting lip which extends around the forepart and along both sides of the shank portion of the unit. Such a unit is particularly adapted for use in the manufacture of cement-lasted shoes wherein the lasting allowance of the upper is to be temporarily held in overlasted position upon the margin of the insole by stapling its edge to a lasting lip on the insole unit, as disclosed, for example, in the Goddu Patent No. 1,932,545, hereinbefore referred to.

In making a shoe having my improved insole unit embedded therein the insole is assembled with an upper on a last and the margins of the insole and the upper are coated with cement. Thereafter, the upper is worked over the last and its margin is laid in overlasted position upon the margin of the insole in the forepart of the unit and upon the margin of the reinforcing piece in the shank portion of the unit and the edges of the upper margins are secured by means of staples to the lasting lip. After the lasting cement has become set, the lasting lip and the edge portions of the upper which are attached thereto are trimmed off below the line of staples. During the lasting of the upper the filler piece determines the location of the inner boundary of the cement bond between the upper and the insole so as to predetermine where the trimming of the upper is to take place. The filler piece being of substantial thickness its edge, in conjunction with the outer edge portions of the attached lasting lip, functions as a lasting shoulder to deflect the edge of the lasting allowance upwardly in such a way as to facilitate the trimming of the upper. The filler piece also serves to fill the space between the inner and outer soles within the trimmed edges of the upper so as to avoid the formation of a hollow in the central forepart portion of the outsole and being made of yielding material the filler piece also serves effectively to cushion the foot of the wearer.

Having described my invention, what I claim as new and desire to secure by Letters Patent of the United States is:

1. That improvement in methods of making reinforced insole units which consists in securing a shank reinforcing piece to the lower or lasting side of an insole and molding said piece and the adjacent portion of the insole to shape them to correspond to the curvatures in the shank portion of a last bottom, forming a filler piece substantially smaller than said insole and having an edge contour corresponding to that of the shank and forepart of the insole, stitching a tape to one side of the shank and forepart of said filler piece in position to provide a marginal lasting lip, and securing the opposite side of said filler piece to the lasting side of the forepart of said insole and to the previously molded reinforcing piece in position to leave exposed marginal portions of the insole forepart and the reinforcing piece of substantial width outside of the lasting lip to receiving the lasting allowance of a shoe upper.

2. That improvement in methods of making reinforced insole units which consists in forming an insole, forming a heel-and-shank reinforcing piece with an edge contour corresponding to that of the heel and shank portions of said insole, assembling said parts with a longitudinally curved shank stiffener between them and with one end portion of the shank stiffener projecting forwardly beyond the reinforcing piece, shaping the shank portions of the insole and the reinforcing piece to conform to the longitudinal curvature of the shank stiffener and securing said parts together, making a filler piece substantially smaller than said insole and having an edge contour corresponding to that of the shank and forepart of the insole, forming a marginal lasting lip upon the shank and forepart of said filler piece, and securing said filler piece in a substantially central position upon the lasting sides of the insole forepart and the reinforcing piece thereby covering the forwardly projecting end of the shank stiffener and leaving exposed marginal portions of the insole forepart and the reinforcing piece outside of said lasting lip to receive the lasting allowance of a shoe upper.

3. That improvement in methods of making reinforced insole units which consists in forming an insole, forming a heel-and-shank reinforcing piece, forming a filler piece substantially smaller than said insole and having an edge contour corresponding to that of the shank and forepart of the insole, forming a marginal lasting lip upon the shank and forepart of said filler piece, securing the forepart of said filler piece to the forepart of said insole at the lasting side of the latter, and thereafter securing said heel-and-shank reinforcing piece to the lasting side of the insole, and securing the shank portion of said filler piece to said reinforcing piece.

4. That improvement in methods of making insole units for use in the manufacture of cement-lasted shoes which consists in forming a filler and cushion piece of a size and shape to fit within the overlasted margins of a shoe upper in the shank and forepart of a shoe, stitching strip material to one side of said piece by a seam located close to the edge of the strip material and close to the edge of said filler and cushion piece thereby providing a lasting lip at that side of said piece and reinforcing the edge of said piece by means of the stitches to adapt it to constitute an effective lasting shoulder, providing an insole having a heel and shank reinforcing piece secured thereto, and securing the unlipped side of said filler piece by means of adhesive to said reinforcing piece and to the unreinforced forepart of the insole in position to provide a lasting lip and a reinforced lasting shoulder spaced a substantial distance from the edge of the insole.

5. That improvement in methods of making reinforced insole units of the type in which a shank reinforcing piece is secured to the lower or lasting side of an insole and which consists in forming a lasting lip along the opposite lateral margins of a sole-shaped filler piece, securing said filler piece to the lasting side of said insole unit, and forming on the heel-seat portion of said reinforcing piece at the lasting side thereof a projection constructed and arranged to fill the space within the overlasted margins of the upper materials in the heel-seat portion of a shoe.

6. That improvement in methods of making reinforced insole units which consists in securing a shank-and-heel reinforcing piece to the lower or lasting side of an insole and molding the shank portions of said parts to correspond to the curvatures in the shank portion of a last bottom, cutting out of soft, flexible material a filler and cushion piece smaller than the shank and forepart of said insole but of corresponding edge contour, forming a lasting lip along the opposite lateral margins of said filler piece, securing said filler piece to the lasting sides of said insole forepart and said reinforcing piece in position to leave exposed marginal portions of said parts of substantial width, and securing to the central heel-seat portion of the lasting side of said reinforcing piece a filler piece of relatively hard stiff material shaped to fill the space within the overlasted margins of the upper materials in the heel seat of a shoe.

7. A reinforced insole unit comprising an insole, a heel-and-shank reinforcing piece secured to the heel and shank portions of the insole, a filler piece secured by means of adhesive only to the forepart of the insole and to the shank portion of said reinforcing piece, said filler piece being smaller than the insole and being arranged with its edge substantially parallel to the edge of the latter, and a tape stitched to the exposed side of said filler piece and extending along its margin to constitute a lasting lip for the shank and forepart of said unit.

8. An insole unit comprising an insole having a shank reinforcing piece secured to one side thereof, a soft, flexible filler and cushion piece corresponding in edge contour to but smaller than the shank and forepart of the insole secured to said reinforcing piece and to the unreinforced forepart of the insole by means of adhesive, and a lip formed of strip material secured to the margin of said piece by stitches which extend through said piece but not through the insole.

9. A reinforced insole unit comprising an insole, a heel-and-shank reinforcing piece secured to the lower or lasting side of the insole, a soft, flexible filler and cushion piece secured to the forepart of said insole at its lasting side and to said reinforcing piece, the edge of said filler piece being spaced a substantial distance from the edge of the insole, and a filler piece of hard, stiff material secured to the lasting side of the central heel-seat portion of said reinforcing piece and shaped to fill the space between the overlasted upper materials in the heel seat of a shoe.

10. A reinforced insole unit comprising an insole, a heel-and-shank reinforcing piece secured to the heel and shank portions of the insole, a filler piece secured to the forepart of the insole and to the shank portion of the reinforcing piece, said filler piece being smaller than the insole but having its edge substantially parallel to the edge of the insole, a lasting lip extending along the margin of said filler piece in the shank and forepart of said unit, and a projection upon the central heel-seat portion of said reinforcing piece of a thickness substantially equal to that of the upper materials which are to be secured in overlasted position upon the heel portion of the insole unit in the making of a shoe.

11. A reinforced insole unit comprising an insole, a heel-and-shank reinforcing piece secured to the lasting side of said insole, a shank stiffener interposed between said parts and having its front end portion projecting forwardly beyond the front edge of said reinforcing piece, a filler piece secured to the forepart of said insole and to said reinforcing piece and covering the forwardly projecting portion of said shank stiffener, said filler piece being substantially smaller than said insole but corresponding to the latter in edge contour, and a lasting lip stitched to the extreme edge portion of the filler piece at the exposed side of the latter.

GEORGE A. MINER.